United States Patent [19]
Heard

[11] 4,066,233
[45] Jan. 3, 1977

[54] SECURING DEVICE

[76] Inventor: Robert Arthur Henderson Heard, Church Farm, 63 Church Lane, Backwell, Bristol, England

[21] Appl. No.: 695,412

[22] Filed: June 14, 1976

[51] Int. Cl.² .............................................. A47B 96/06
[52] U.S. Cl. .................................. 248/231; 248/74 B
[58] Field of Search .............. 248/228, 229, 230, 231, 248/62, 73, 74 B; 24/243 HC, 21, 19, 286

[56] References Cited
U.S. PATENT DOCUMENTS

| 2,959,388 | 11/1960 | Fogle | 248/231 |
| 3,539,138 | 5/1968 | Desroches | 248/231 |
| 3,559,941 | 2/1971 | Holzman | 248/231 |

FOREIGN PATENT DOCUMENTS 1,235,356   6/1971   United Kingdom ................. 248/231

Primary Examiner—Robert A. Hafer
Attorney, Agent, or Firm—Larson, Taylor & Hinds

[57] ABSTRACT

A mounting device for securing an object to a post has a saddle shaped to seat against the post. A pair of attachment members are loosely carried at opposite ends of the saddle and each is slotted to take a strap to be passed and tightened around the post. The attachment members have stems projecting from the saddle and carrying abutment means, so that when the strap is tightened said object, being located between the abutment means and the saddle, is gripped and secured thereby.

4 Claims, 5 Drawing Figures

U.S. Patent  Jan. 3, 1978  Sheet 1 of 2  4,066,233
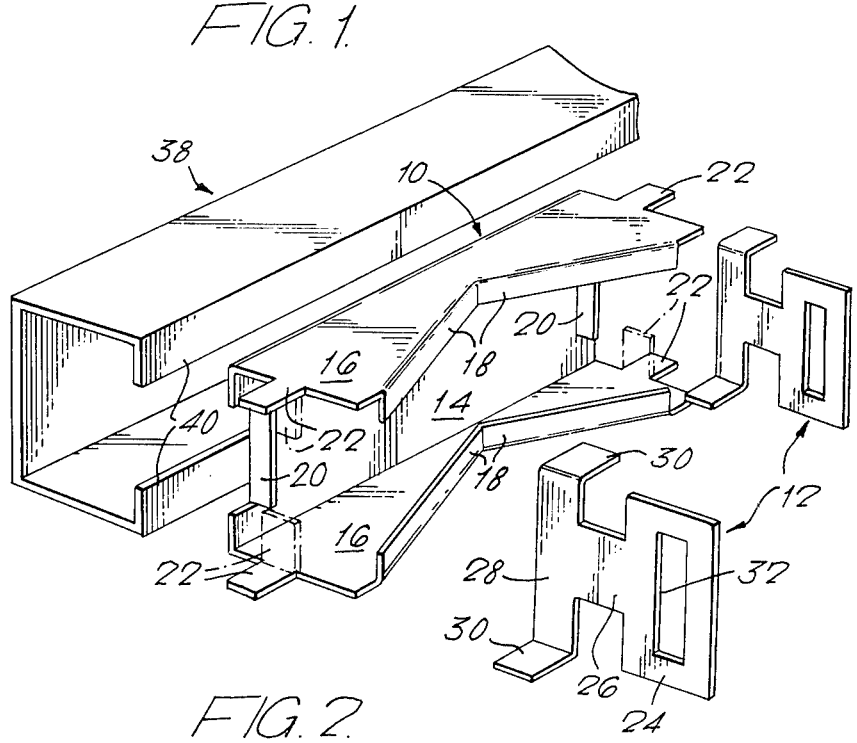
FIG. 1.
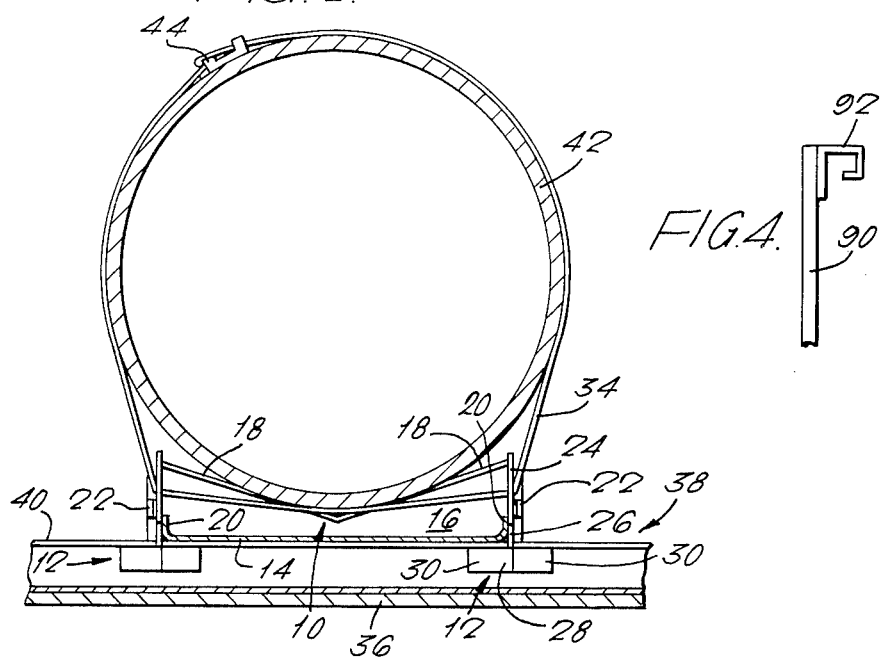
FIG. 2.
FIG. 4.

SECURING DEVICE

FIELD OF THE INVENTION

This invention relates to securing devices, and is particularly applicable to devices for use in securing an object, for example a sign, to a post or the like body.

BACKGROUND TO THE INVENTION

It is often necessary to mount a body to a channel member having a restricted mouth. Such channel members may be provided on the rear of a sign, the body to be mounted being a supporting post for the sign. Alternatively the channel member may be a structural element to which a body, such as an electric cable or group of cables are to be mounted. Frequently the channel members are of soft aluminium, whereas the mounting devices have to be of high tensile material such as stainless steel. Some signs, however, do not have such channel, but may have a return flange at the edge. It is an object of the present invention to provide a mounting device which is of wider applicability than the majority of mounting devices hitherto known.

SUMMARY OF THE INVENTION

According to the present invention there is provided a device for use in securing an object to a post or the like body, comprising a saddle having a pair of opposite side members of similar form and spaced apart, the side members being shaped along one edge to seat against the post, and a pair of attachment members loosely carried at opposite ends of the saddle between the two side members, each attachment member having a body portion located at the respective end of the saddle between the side members and a stem portion projecting beyond the saddle in the direction remote from said shaped edges of the side members thereof and provided with abutment means, the body portion being slotted to receive a strap whereby said strap may be passed through the slotted body portions of the attachment members in the space between the side members of the saddle and around the post for securing the saddle to the post, tightening on the strap causing a gripping action on a said object located between the abutment means of the attachment members and the saddle.

In one form of the invention, the side members of the saddle are joined by a base member, the stems of the attachment members passing alongside the ends of the base member, the abutment means being provided by lateral enlargements on the ends of the stems of the attachment members for engagement in a channel which forms part of the object which is to be attached to the post, whereby the enlarged abutment portions of the stems may be retained by inturned lips at the mouth of the channel, said lips being thereby gripped between the enlarged abutment portions of the attachment members and the base member of the saddle when said strap is tightened around the post.

In another form of the invention, the saddle is carried on one outside face of one of a pair of mutually inwardly facing channel shaped elongate members, the stems of the attachment members passing slidably through openings in the elongate member to which the saddle is attached and secured to the opposite elongate member, whereby tightening said strap around the post causes said opposite elongate member to be drawn towards the other elongate member thereby gripping an object located therebetween.

BRIEF DESCRIPTION OF THE DRAWINGS

In order that the invention may be more clearly understood, various embodiments will now be described with reference to the accompanying drawings, wherein:

FIG. 1 shows an exploded perspective view of a saddle and attachment members of a first embodiment, FIG. 2 shows a cross-sectional plan view of the device in use, FIG. 4 shows an end view of part of an alternative type of sign for use with the mounting device of FIG. 3.

DESCRIPTION OF PREFERRED EMBODIMENTS

Figure 3:
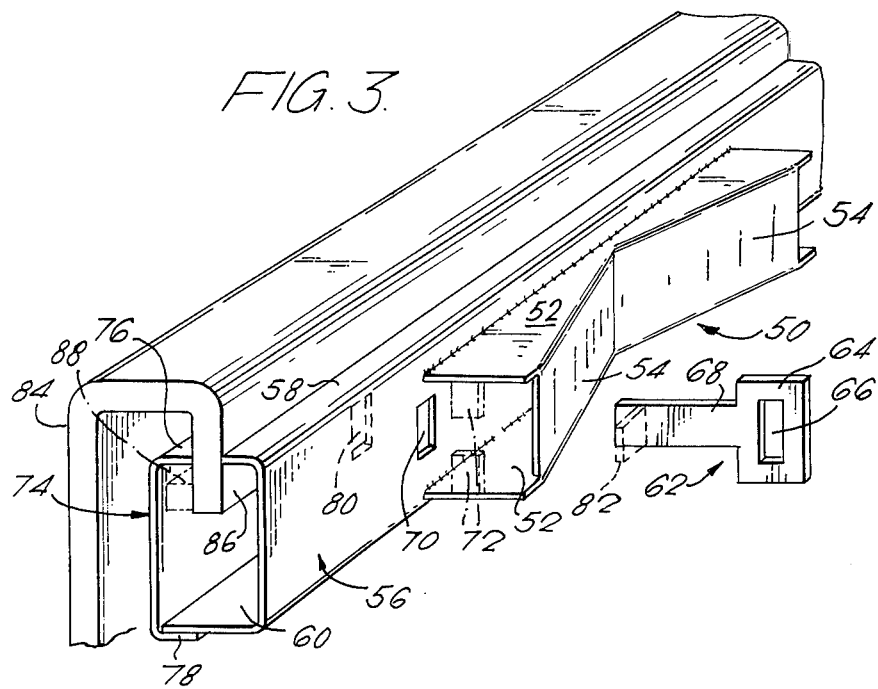
FIG. 3 shows an exploded perspective view of a second form of the device.

Referring to the drawings, and firstly to FIGS. 1 and 2; the device comprises a saddle 10 and a pair of attachment members 12. The saddle is made from a single piece of sheet metal, for example stainless steel sheet, and comprises a flat base member 14 and a pair of side members 16 projecting therefrom. The side members are of similar shape, their edges remote from the base member 14 being of shallow V-shape and are turned over to provide mutually inwardly directing flanges 18. A part of the base member at each end thereof is turned upwardly between the side members to provide flanges 20. Lugs 22 project from the side members 16 at each end of the saddle.

Each attachment member 12 is likewise conveniently made from sheet metal, and comprises a rectangular body part 24 which is slightly narrower than the spacing between the side members 16 of the saddle. A narrower stem 26 projects from the body 24, and terminates in a laterally enlarged head 28. This head may have ears 30 at each side of the head extending at right angles thereto, either in the same or in opposite directions (as shown). The body 24 has a slot 32 therein to receive a flexible high tensile strap 34, as shown in FIG. 2.

FIG. 2 also shows a fragment of the sign which is to be attached to a post by means of this fixing device. A sign panel 36 has one or more elongate channel members 38 secured to its rear surface, partly to make the panel more rigid, and partly to provide a suitable fixing point. The channel is conveniently made from extruded aluminium, and has inturned lips 40 at the mouth thereof.

FIG. 2 shows how the device is used. Prior to use the attachment members 12 are assembled to the saddle 10 by locating the body parts 24 between the side members 16 with the stem 26 projecting through the space in the base member 14 left by turning up the flanges 20. The flanges 20 provide an abutment on one side of the attachment members, and the lugs 22 are turned mutually inwardly at each end of the saddle to provide a counter-abutment for loosely retaining the attachment members. The attachment members are prevented from sliding out by virtue of the fact that the flanges 20 extend only part way across the base part of the saddle for a distance less than the width of the body or head of the attachment members, so that the adjacent shoulders of the base member retain the attachment members by engagement alternatively with the head or body thereof.

The saddle is mounted to the channel 38 at the back of a sign by inserting the heads of the attachment members into one end of the channel and then sliding the device along the channel to a suitable position. A flexible high tensile strap 34, for example of stainless steel, is threaded through the slots 32 in the attachment members, either before or after attaching the device to the channel. The ends of the strap are taken around a post 42 and secured in conventional manner by means of a buckle 44, after applying suitable tension to the strap.

From FIG. 2 it will be seen that the post 42 seats in the generally concave side of the saddle, the flanges 18 providing a suitable area of abutment. Tensioning of the strap 34 tends to draw the attachment members 12 towards the post, and thereby the head 28 of each attachment member is forced against the lips 40 of the channel 38 which are thereby gripped between the heads of the attachment members and the base member 14 of the saddle. The ears 30, if present, provide an increased area of abutment with the lips 40, which may be necessary in the case of aluminium channels particularly, to prevent the head of the attachment member from cutting through the lips of the channel.

The device is very simple to manufacture and to use, and is very versatile in use. In particular, it can be used for attachment to posts which are of larger or smaller diameter than the length of the saddle.

Referring now to FIG. 3 of the drawings; the device in this case comprises a saddle 50, which is also made from sheet metal, with opposed pair of side members 52 shaped along one edge to provide a shallow V-concavity. V-shaped edges are bridged by webs 54, which provide an extensive bearing surface for the post. The opposite edges of the side members 52 are welded to a first channel shaped member 56. The two sides of the channel are of unequal depth, the side 58 being shorter than the side 60. The web portions 54 terminate short of the ends of the side members 52 of the saddle, and in the shallow space left thereby, attachment members 62 are located (only one such attachment member is shown). Each attachment member 62 has a rectangular body part 64 similar to that described in the first embodiment, with a slot 66, and with a stem 68 projecting from the body part to pass slidably through a slot 70 in the channel member 56. Optionally, lugs 72 may be provided on the side members 52 of the saddle to assist in retaining the attachment members in their correct locations. A second channel member 74 is provided facing the first channel member 56, this channel member has a side 76 similar to the side 58 of the first channel member, and opposite side 78. The base web of the channel 74 is slightly wider than the base web of the channel 56, so that when the wall 60 abuts the inside surface of the wall 78, in the manner shown in FIG. 3, the wall 58 is directly opposite the wall 76. The depth of the wall 60 is somewhat greater than the combined depths of the walls 58 and 76. The stem 68 of each attachment member passes slidably through the respective slot 70 in the first channel member 56 and passes also through an opposite slot 80 in the second channel member 74. The projecting end of the stem 68 is turned over at 82 on the side of the channel 74 remote from the saddle and is welded or otherwise secured to the channel 74.

In use, the device can be attached to a post by means of a flexible strap, in the same manner as described with reference to FIG. 2. In this case, however, tensioning of the strap will cause the channel member 74 to be urged closer to the channel member 56, and thus the opposed sides 58,76 of the channels can act as a pair of jaws. In the embodiment shown in FIG. 3, a sign panel 84 is turned over along one edge into the form of a channel, so that one limb 86 of the channel is parallel to and spaced from the plane of the sign panel 84. This limb can thus be inserted into the mouth between the sides 58,76 of the channel members 56,74 prior to tightening the strap, so that when the strap is tightened the flange 86 is securely gripped. If, in addition, the free edge of the flange 86 has been inturned to form a rib 88, this will provide security against the mounting device slipping off the flange 86, particularly prior to tightening the strap. The sign panel 84 can be provided with a similar channel shaped portion on the opposite edge, which can be attached to the same support post by a similar attachment device.

This type of fixing device is, perhaps, even more versatile than the first embodiment described above, since it does not require the presence of a channel shaped member on the rear of the article which is being mounted to the post. It is only necessary that there be a flange which can be received in the jaws as shown in FIG. 4. Instead of turning over the edges of a metal sign panel, a conventional sign panel 90 could have an elongate member 92 of a similar shape, secured to the rear surface of the sign. Instead of a single strap, separate straps could be connected to, or be extensions of, the two attachment members.

Figure 5:
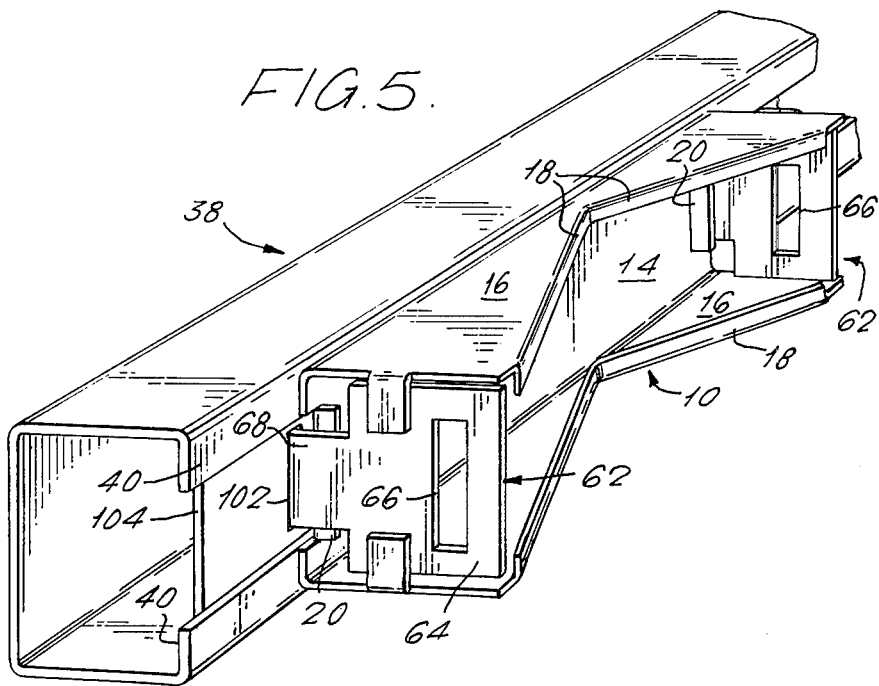
FIG. 5 shows a perspective view of a third embodiment of the device.

FIG. 5 shows an embodiment which comprises a saddle 10, which seats over the open mouth of a channel section member 38, in the same way as in FIG. 1. A pair of stainless steel attachment members 62, similar to those of FIG. 3, are provided, located one at each end of the saddle 10. The stem 68 of each attachment member 62 is passed through a slot 102 in a respective end portion of an elongated stainless steel plate 104, and the ends of the stems being bent at right-angles towards each other and spot welded to the underside of the plate 104. The slots 66 receive the cranked ends of flexible stainless steel straps, or a single strap passed through both slots, the free strap ends being passed around the post, tightened and secured by suitable means, as in FIG. 2. Prior to attachment to the post, the saddle assembly is slid lengthwise into the channel 38 at the rear of the sign, the plate 104 engaging the inturned lips 40 of the mouth of the channel, and preventing the device from becoming dislodged from the channel. When the strap is tightened, the lips 40 of the channel are gripped between the plate 104 and the base 14 of the saddle.

Instead of the stems of the attachment members 62 passing through slots in the plate 104 and being welded thereto, the plate could be an integral extension of the stems of the two attachment members, so that the attachment members 62 and the plate 104 are stamped out of a single piece of steel sheet and bent into the U-form shown.

Although the invention has been illustrated with reference to mounting a sign to a post, it is to be understood that the devices could be used for mounting other bodies, such as pipes or cables (for convenience referred to generically as "posts"), to restricted mouth channel members.

I claim:

1. A device for use in securing an object to a post or the like body, said device comprising a saddle having a pair of opposite side members of similar form and spaced apart, the side members being shaped along one edge to seat against a post, and a pair of attachment members loosely carried at opposite ends of the saddle, each attachment member having a body portion located at the respective end of the saddle and a stem portion projecting beyond the saddle in the direction remote from said shaped edges of the side members thereof and provided with abutment means to engage an object to be secured, each body portion being constructed and arranged to receive at least one strap such that a strap may be passed around a post to secure the saddle to such a post and tightened to cause a gripping action on an object located between the abutment means of the attachment members and the saddle.

2. A securing device according to claim 1 for use in securing to a post an object having a channel formed therein, wherein the side members of the saddle are joined by a base member, the stems of the attachment members passing alongside the ends of the base member, the abutment means being provided by lateral enlargements on the ends of the stems of the attachment members so as to be engageable in a channel which forms part of the object which is to be attached to the post, whereby the enlarged abutment portions of the stems may be retained by inturned lips at the mouth of the channel, such that the lips can be gripped between the enlarged abutment portions of the attachment members and the base member of the saddle when the strap is tightened around a post.

3. A securing device according to claim 1 wherein the saddle is carried on one outside face of one of a pair of mutually inwardly facing channel shaped elongate members, the stems of the attachment members passing slidably through openings in the elongate member to which the saddle is attached and secured to the opposite elongate member, whereby tightening the strap around a post will cause said opposite elongate member to be drawn towards the other elongate member thereby gripping an object located therebetween.

4. A securing device according to claim 1 wherein the abutment means comprises an elongate plate with which the stems of the abutment members are connected, whereby the plate may be slidably engaged in a channel which forms part of the object which is to be attached to the post, such that the plate will be retained therein by inturned lips at the mouth of the channel, the lips being thereby gripped between the plate and the base of the saddle when the strap is tightened around the post.

* * * * *